(12) United States Patent
Huang et al.

(10) Patent No.: US 9,253,142 B2
(45) Date of Patent: Feb. 2, 2016

(54) PROVIDING TELECOMMUNICATION SERVICES BASED ON AN E.164 NUMBER MAPPING (ENUM) REQUEST

(75) Inventors: Zhufeng Huang, Andover, MA (US); Rahul Jain, Pepperell, MA (US); Ramanathan K. Ramanathan, North Andover, MA (US); Ti-yuan Dean Shu, Andover, MA (US)

(73) Assignee: SONUS NETWORKS, INC., Westford, MA (US)

( * ) Notice: Subject to any disclaimer, the term of this patent is extended or adjusted under 35 U.S.C. 154(b) by 252 days.

(21) Appl. No.: 13/118,140

(22) Filed: May 27, 2011

(65) Prior Publication Data

US 2012/0300768 A1 Nov. 29, 2012

(51) Int. Cl.
*H04L 12/66* (2006.01)
*H04L 29/12* (2006.01)

(52) U.S. Cl.
CPC .................................... *H04L 61/157* (2013.01)

(58) Field of Classification Search
None
See application file for complete search history.

(56) References Cited

U.S. PATENT DOCUMENTS

| 8,730,970 B2* | 5/2014 | Allison et al. ............. 370/395.2 |
| 8,843,152 B2* | 9/2014 | Nguyen ......................... 455/453 |
| 2007/0121908 A1* | 5/2007 | Benedyk et al. ............... 379/350 |
| 2007/0275738 A1* | 11/2007 | Hewes et al. .................. 455/466 |
| 2010/0040061 A1* | 2/2010 | McGuire et al. ............... 370/392 |
| 2010/0061394 A1* | 3/2010 | Sindhu et al. .................. 370/422 |
| 2011/0150196 A1* | 6/2011 | Dwight et al. ............ 379/142.04 |
| 2011/0202614 A1* | 8/2011 | Graig et al. .................... 709/206 |
| 2012/0140774 A1* | 6/2012 | Oster et al. ..................... 370/401 |

* cited by examiner

*Primary Examiner* — Nicholas Sloms
(74) *Attorney, Agent, or Firm* — Stephen T. Straub; Ronald P. Straub; Michael P. Straub

(57) ABSTRACT

Data associated with an E.164 number mapping (ENUM) request can be received from an element of a telecommunications network. Logical trunk-group information and gateway information can be associated with the ENUM request. A call is managed by the computing element through a packet-based network based at least in part on the logical trunk-group information and the gateway information.

20 Claims, 4 Drawing Sheets

PROVIDING TELECOMMUNICATION SERVICES BASED ON AN E.164 NUMBER MAPPING (ENUM) REQUEST

FIELD OF THE INVENTION

The description describes providing telecommunications services based on an E.164 Number Mapping ("ENUM") Request.

BACKGROUND

Being able to dial telephone calls the way customers have come to expect is considered important for the convergence of classic telephone service and Internet telephony, such as voice-over-Internet Protocol ("VoIP"). In classic telephone service, a party is associated with one or more personal identifiers (e.g., a telephone number) that might be used for one or more communication services such as, for example, handling telephone calls, sending or receiving text messages or email, or other services. Telephone number mapping typically involves harmonizing the telephone numbering system of the public-switched telephone network ("PSTN") with the addressing and identification-name spaces of data networks (including public data networks such as the Internet) to allow communication with a party. Telephone numbers are typically organized according to the E.164 standard, promulgated by the International Telecommunications Union ("ITU"), while the Internet uses the Domain Name System ("DNS") to link domain names to Internet Protocol ("IP") addresses and/or other resource information. Telephone number mapping systems involve determining applicable network (e.g., Internet) communications servers or devices responsible for servicing a telephone number using DNS lookups.

A common facility for telephone number mapping is based on the E.164 Number Mapping standard ("ENUM"), developed by the Internet Engineering Task Force ("IETF"). The ENUM protocol uses customized DNS record-types to translate a PSTN-like telephone number into a Uniform Resource Locator ("URL") or IP address that can be used for Internet or data communications.

Implementation of ENUM typically involves a request by an element of a telecommunications network. An ENUM request typically contains information for performing number mapping, but the ENUM request does not contain sufficient information to allow a carrier to make network routing and/or class-of-service decisions.

SUMMARY OF THE INVENTION

The concepts described herein address the problem by augmenting received ENUM requests with additional information or data that can be used for intelligent routing and/or services decisions. The additional information also provides carrier flexibility in managing telephone calls through packet-based networks, such as routing or class-of-service decisions. An ENUM request can be augmented by associating attributes to an ENUM query or request that assists in ingress processing. The attributes can be associated with signaling information and/or a network element or gateway originating the ENUM request. In some embodiments, the data or information is associated with the ENUM request by adding, appending, or prepending information to a data packet, encapsulating the data packet, or constructing/reconstructing a data packet to include the information. The information associated with the ENUM request can include, for example, data associated with a logical trunk group and/or data associated with a gateway, such as a media gateway.

The description describes a number of ways to associate data with an ENUM request. One implementation involves analyzing an IP address of a client or network device making an ENUM request to determine data to associate with the ENUM request. Another implementation involves analyzing a domain name in an ENUM request to determine data to associate with the ENUM request.

Upon the information being associated with the ENUM request, advanced telecommunications services a telephone call can be implemented. Examples of advanced services include, for ingress processing, for example, digit manipulation, dial plan, class-of-service policies, number translation, local number portability, and the like. Additionally, routing policies can be applied to the telephone call such as, for example, proportion, sequence, or route-hopping policies. The augmented ENUM request can be used to control media and/or signaling information or attributes in an ENUM response.

In one aspect, there is a computer-implemented method including receiving, by a computing element, data associated with an E.164 number mapping (ENUM) request from an element of a telecommunications network. The method includes associating, by the computing element, logical trunk-group information and gateway information with the ENUM request. A call is managed by the computing element through a packet-based network based at least in part on the logical trunk-group information and the gateway information.

In another aspect, there is a telecommunications system including an interface in communication with a telecommunications network and a packet-based network, and a processor module. The interface receives an E.164 number mapping (ENUM) request from an element of the telecommunications network. The processor module is configured to associate logical trunk group information and gateway information with the ENUM request and manage a call through the packet-based network based at least in part on the logical trunk group information and the gateway information.

In still another aspect, there is a computer program product, tangibly embodied in a non-transitory computer-readable storage medium, containing instructions operable to cause data processing apparatus to receive data associated with an E.164 number mapping (ENUM) request from an element of a telecommunications network; associate logical trunk-group information and gateway information with the ENUM request; and manage a call through the packet-based network based at least in part on the logical trunk group and the gateway information.

In yet another aspect, there is a telecommunications system including an interface means for receiving data associated with an E.164 number mapping (ENUM) request from an element of a telecommunications network; data association means for associating logical trunk group information and gateway information with the ENUM request; and call processing means for managing a call through a packet-based network based at least in part on the logical trunk group information and the gateway information.

In other examples, any of the aspects above, or any apparatus, system or device, or method, process or technique, described herein, can include one or more of the following features. The data associated with the ENUM request can include a domain name, an IP address, or both, which can be associated with the element of the telecommunications network.

In some embodiments, managing the call includes at least one of routing the call through the packet-based network, establishing a predetermined class of service with the call, or any combination thereof. Routing the call through the packet-based network can include routing the call according to a routing policy. Performing traffic control can include limiting a number of routing requests.

Managing the call can include associating signaling information with the call for routing through the packet-based network, or processing an ingress portion of the call including at least one of digit manipulation, dial-plan processing, class-of-service processing, number translation, local number portability, or any combination thereof.

In various embodiments, the element of the telecommunications network is an endpoint device and the logical trunk-group information and the gateway information are associated with the endpoint device. The element of the telecommunications network can be an aggregator, and the logical trunk-group information and the gateway information can be associated with an endpoint device of the telecommunications network in communication with the aggregator.

The method can include determining a network device to associate with a logical trunk and a gateway device. The received data can be compared with information associated with a set of ENUM clients stored in a database. Upon the received data matching data associated with an ENUM client of the set of ENUM clients, the ENUM client can be defined as an ingress gateway for the gateway information and an associated default trunk group for the logical-trunk group information.

In various embodiments, the method includes determining whether the default trunk group is configured, determining whether hop-by-hop routing is enabled, and routing the call based on an original source of the ENUM request or an immediately preceding element of the telecommunications network. The call can be routed through the packet-based network. In certain embodiments, data associated with a policy query can be received based in part on the ingress gateway and the default trunk group.

In various embodiments, a telecommunications system includes comprising a policy server in communication with the processor module to provide a routing policy for routing the call through the packet-based network. A softswitch can be in communication with the processor module to provide a routing policy for routing the call through the packet-based network. In various embodiments, the element of the telecommunications network is the aggregator of ENUM requests or an endpoint device. A telecommunications system can include a forwarder of ENUM requests.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention

DETAILED DESCRIPTION

ENUM requests can be augmented with additional information or data that can be used for intelligent routing and/or services decisions. An ENUM request can be augmented by associating attributes to an ENUM query or request that assists in ingress processing. The attributes can be associated with signaling information and/or a network element or gateway originating the ENUM request. In some embodiments, the data or information is associated with the ENUM request by adding, appending, or prepending information to a data packet, encapsulating the data packet, or constructing/reconstructing a data packet to include the information. The information associated with the ENUM request can include, for example, data associated with a logical trunk group and/or data associated with a gateway, such as a media gateway.

In some embodiments, the input traffic flow and the output traffic flow include a series of packets, which are units of data formatted for transmission over a communications network. A packet generally includes metadata and a payload. The packet metadata includes attributes related to the packet (e.g., arrival information, destination information, origin information, encoding protocols, or structure of information in the packet). The payload includes the user data to be transmitted. In some embodiments, the input traffic flow and the output traffic flow form a physical and/or logical connection between the IP multimedia system and the communications network.

In various embodiments, one or more of a policy server, an application server, an edge server, a gateway, a switch, or a node can be used to route calls and manage policy in a telecommunications system (e.g., a network such as a circuit switched network, a packet based network or a blended circuit/packet networks). In one embodiment, the policy server is a PSX Centralized Route Server available from Sonus Networks, Inc. A PSX Centralized Route Server is a flexible routing server supporting Session Initiation Protocol (SIP), H.323, SS7/C7 and ENUM/DNS queries.

A policy server can link a trunkgroup (TG) and/or a gateway (GW) to and incoming ENUM query. The trunkgroup can include ingress attributes such as dial plan, numbering plan, class of service, and/or number translation. The trunkgroup can be a virtual trunkgroup created for an ENUM request. The gateway can include attributes like class of service and cluster profile. Incoming queries can originate from any type of endpoint that requires ENUM resolution (e.g., SIP, H.323 and Diameter endpoints).

Figure 1:
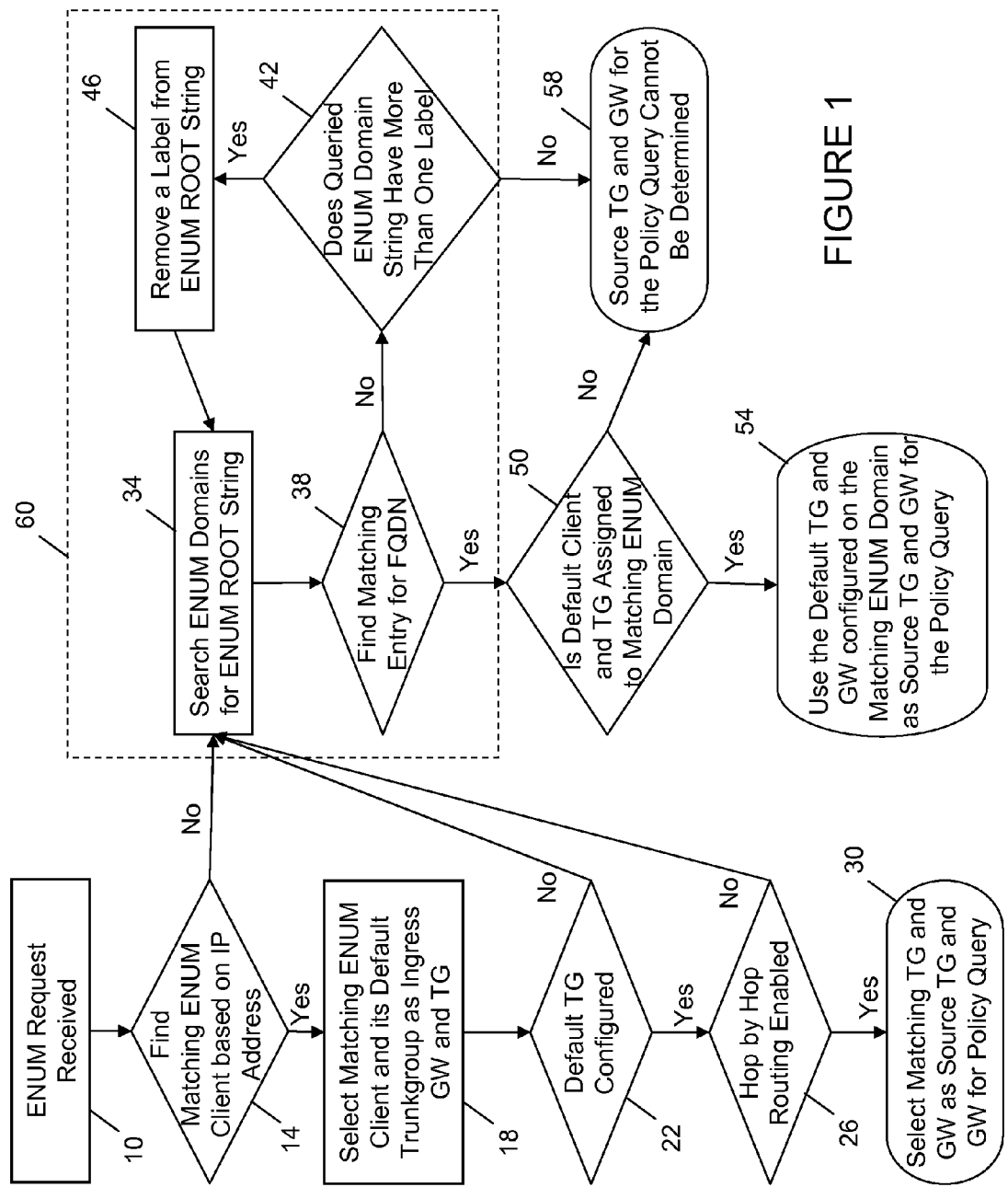
FIG. 1 is a flow chart showing an exemplary process for associating logical trunk group information with an ENUM request based on the IP address of the requesting element.

FIG. 1 shows a flowchart of a process for associating logical trunk group information with an ENUM request based on the IP address of the requesting element. The process can be used to determine or identify the ingress trunkgroup and/or gateway.

An ENUM request is received (10). The process attempts to locate a matching ENUM client (14). If the matching ENUM client is found, the matching ENUM client and the default trunkgroup are selected as the ingress gateway and trunkgroup, respectively (18). The process determines whether the default trunkgroup is configured (22). If it is, the process determines whether hop by hop routing is enabled (26). A matching TG and GW can be selected as the source TG and GW for the policy query (30).

If a matching ENUM client is not found (14), if the default trunkgroup is not configured (22) or if hop by hop routing is not enabled (26), the process searches for ENUM domains for the ENUM ROOT string (34). The ENUM ROOT refers to the domain name hierarchy to which the number belongs for a particular query. For example, a query for a called number 1 978 555 1234 in the public domain appears as 4.3.2.1.5.5.5.8.7.9.1.e164.arpa. Here, the ENUM ROOT domain is e164.arpa.

If a matching entry for the fully qualified domain name (FQDN) is not found (38), the process determines whether the queried ENUM domain name has more than one label (42). If it does, then a label is removed from the ENUM ROOT string (e.g., the left most label) (46). The process then searches for ENUM domains for the ENUM ROOT string again (34).

The process steps in box 60 can include a longest match or best match algorithm for the ENUM ROOT. For example, a query for 4.3.2.1.5.5.5.8.7.9.1.e164.arpa triggers a match for the ENUM ROOT e164.arpa. If the domain name is not found, then the algorithm looks for a match of arpa.

If a matching entry for the FQDN is found (38), the process determines whether a default client and trunkgroup are assigned to the matching ENUM domain (50). If one is, the process uses the default gateway and trunkgroup configured on the matching ENUM domain as the source gateway and trunkgroup for the policy query (54). If a default client and trunkgroup are not assigned to the matching ENUM domain (50) or if the queried ENUM domain name does not have more than one label (42), the process cannot determine the source gateway and trunkgroup for the policy query (58). The process returns a "no name" ENUM response.

Figure 2:
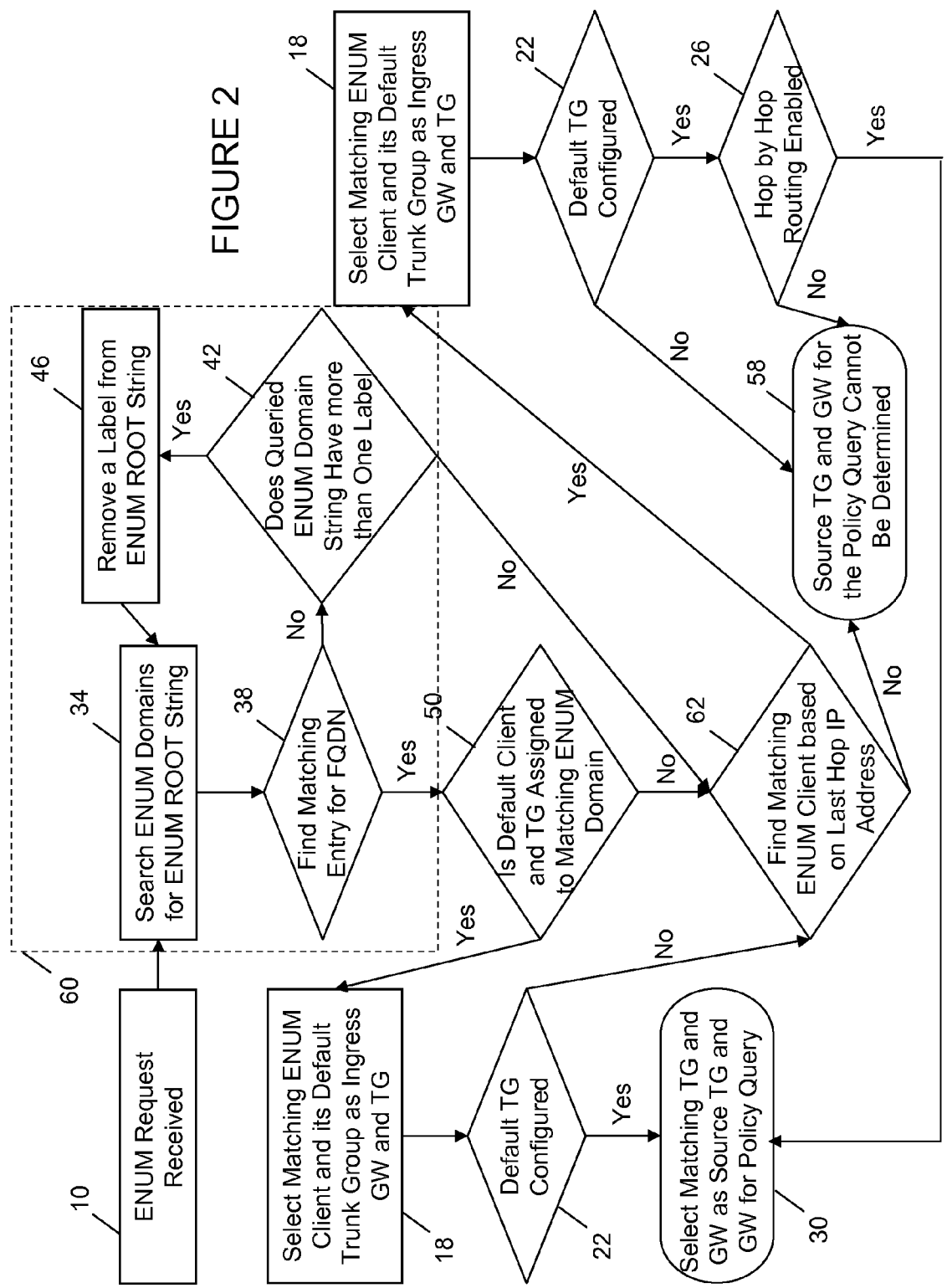
FIG. 2 is a flow chart showing an exemplary process for associating logical trunk group information with an ENUM request based on the domain name of the requesting element.

FIG. 2 shows a flowchart of a process for associating logical trunk group information with an ENUM request based on the domain name of the requesting element. The process can be used to determine or identify the ingress trunkgroup and/or gateway.

An ENUM request is received (10). The process searches for ENUM domains for the ENUM ROOT string (34). If a matching entry for the FQDN is not found (38), the process determines whether the queried ENUM domain name has more than one label (42). If it does, then a label is removed from the ENUM ROOT string (e.g., the left most label) (46). The process then searches for ENUM domains for the ENUM ROOT string again (34).

If a matching entry for the FQDN is found (38), the process determines whether a default client and trunkgroup are assigned to the matching ENUM domain (50). If one is, the matching ENUM client and the default trunkgroup are selected as the ingress gateway and trunkgroup, respectively (18). The process determines whether the default trunkgroup is configured (22). If it is, the process selects (26) a matching gateway and trunkgroup as the source gateway and trunkgroup for the policy query (30).

If the default trunkgroup is not configured (22), if the queried ENUM domain name does not have more than one label (42), or if a default client and trunkgroup are not assigned to the matching ENUM domain (50), the process attempts to find a matching ENUM client based on the last hop IP address (62). If it does, the matching ENUM client and the default trunkgroup are selected as the ingress gateway and trunkgroup, respectively (18). The process determines whether the default trunkgroup is configured (22). If it is, the process determines whether hop by hop routing is enabled (26). A matching gateway and trunkgroup can be selected as the source gateway and trunkgroup for the policy query (30).

If the default trunkgroup is not configured (22), if hop by hop routing is not enabled (26), or if a matching ENUM client cannot be found based on the last hop IP address (62), the process cannot determine the source gateway and trunkgroup for the policy query (58). The process returns a "no name" ENUM response.

Figure 3:
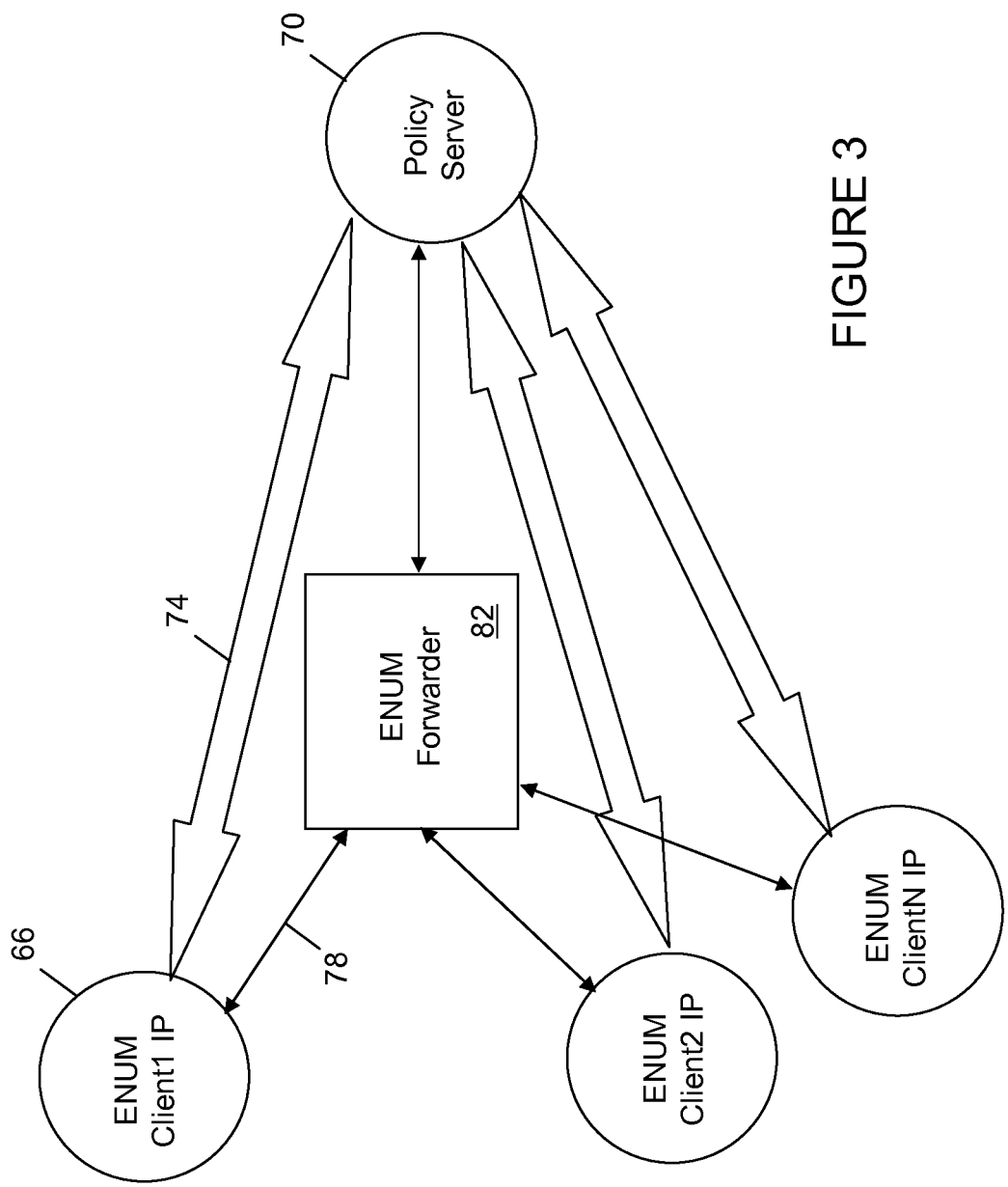
FIG. 3 is a block diagram showing an exemplary network architecture for augmenting ENUM requests for provision of telecommunication services.

FIG. 3 shows a network architecture for augmenting ENUM requests for provision of telecommunication services. This architecture can be used when the IP address of the ENUM client or the domain name in the ENUM query is used to determine the trunkgroup. At least one ENUM client 66 is connected (e.g., directly connected) to a policy server 70 via a virtual ENUM trunkgroup 74. An ENUM request 78 is received by an ENUM forwarder 82, which is in communication with the policy server 70. In certain embodiments, the policy server 70 and the ENUM forwarder 82 are included in a routing server (e.g., a PSX Centralized Route Server).

Figure 4:
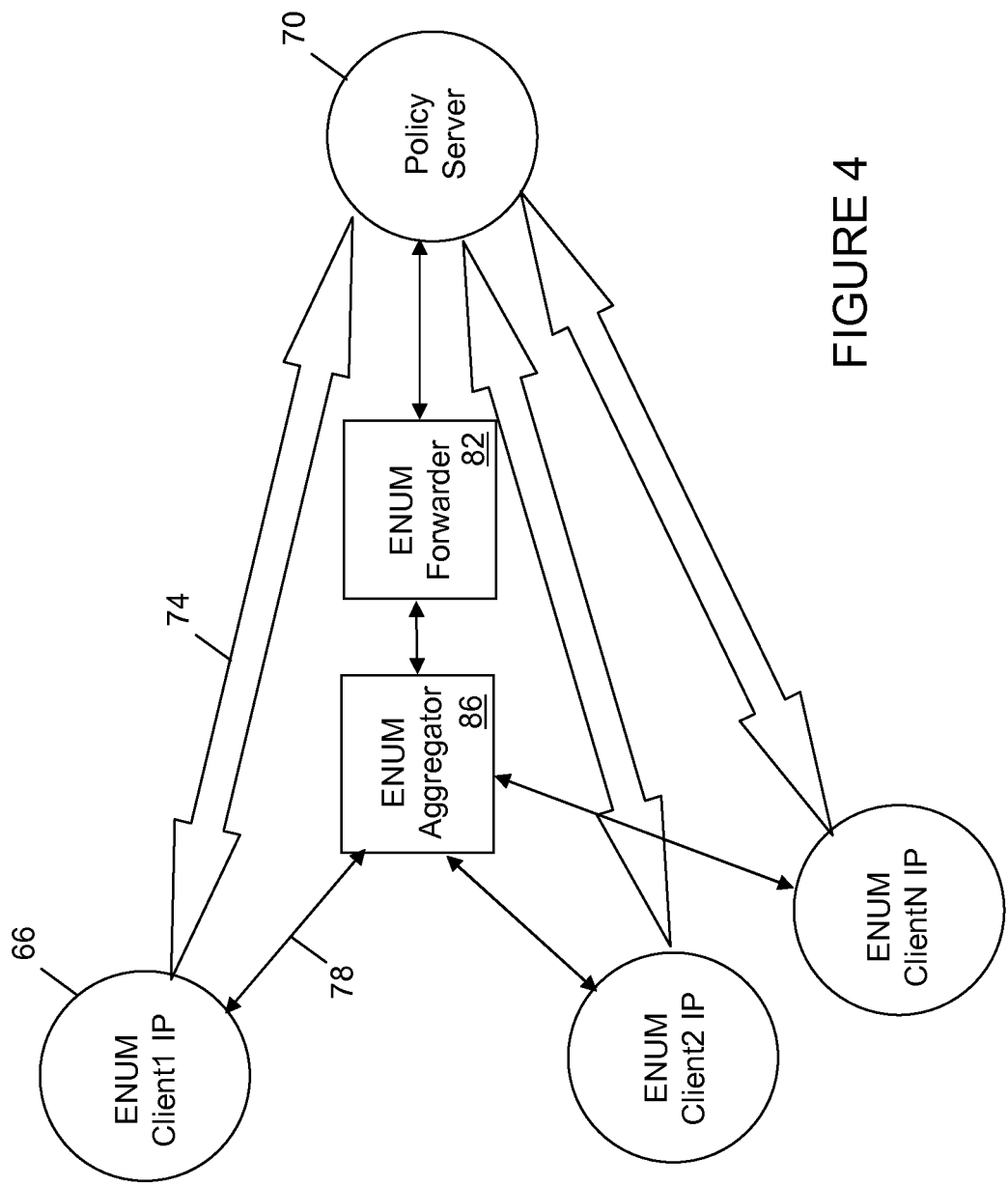
FIG. 4 is a block diagram showing an exemplary network architecture for augmenting ENUM requests for provision of telecommunication services that includes an ENUM aggregator.

FIG. 4 shows another network architecture for augmenting ENUM requests for provision of telecommunication services. This architecture can be used when the domain name in the ENUM query is used to determine the trunkgroup. At least one ENUM client 66 is connected (e.g., directly connected) to an ENUM aggregator 86, which is in communication with the ENUM forwarder 82. In certain embodiments, the policy server 70 and the ENUM forwarder 82 are included in a routing server (e.g., a PSX Centralized Route Server), while the ENUM aggregator 86 is outside the routing server (e.g., on a server prior to the policy server). The ENUM aggregator 86 can be a server for one side and the client for other side.

The source IP based methodology can be better suited for solutions requiring granular control while the ENUM domain based methodology can be better suited for providing aggregated control over routing and policy.

Once the trunkgroup is identified and linked to the ENUM query, the ingress processing, such as, for example, digit manipulations, dial plans, class of service, and/or number translation are available. Routing algorithms such as, for example, proportion, sequence, and/or route hopping are also available to the ENUM query. The IP signaling profile in the trunkgroup can be used to control the media and signaling attributes in the ENUM response.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc. and/or a Cisco® Unified Wireless Phone 7920 available from Cisco Systems, Inc.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A computer-implemented method comprising:
  receiving, by a computing element, data associated with an E.164 number mapping (ENUM) request from an element of a telecommunications network, said data associated with the ENUM request including a domain name;
  associating, by the computing element, logical ingress trunk-group information and gateway information with the ENUM request;
  determining a network device to associate with a logical trunk and a gateway device, said determining comprising:
    (i) comparing the received data with information associated with a set of ENUM clients stored in a database, and
    (ii) upon the received data matching data associated with an ENUM client of the set of ENUM clients, defining the ENUM client as an ingress gateway for the gateway information and an associated ingress default trunk group for the logical ingress trunk group information; and managing, by the computing element, a call through a packet-based network based at least in part on the logical ingress trunk-group information and the gateway information.

2. The method of claim 1 wherein the data associated with the ENUM request further comprises an IP address.

3. The method of claim 2 wherein the domain name, the IP address, or both is associated with the element of the telecommunications network.

4. The method of claim 1 wherein managing the call comprises at least one of routing the call through the packet-based network, establishing a predetermined class of service with the call, or any combination thereof.

5. The method of claim 4 wherein routing the call through the packet-based network comprises routing the call according to a routing policy.

6. The method of claim 4 wherein traffic control is performed, the traffic control comprises limiting a number of routing requests.

7. The method of claim 1 wherein managing the call comprises associating signaling information with the call for routing through the packet-based network.

8. The method of claim 1 wherein managing the call comprises processing an ingress portion of the call including at least one of digit manipulation, dial-plan processing, class-of-service processing, number translation, local number portability, or any combination thereof.

9. The method of claim 1 wherein the element of the telecommunications network is an endpoint device and the ingress logical trunk-group information and the gateway information are associated with the endpoint device.

10. The method of claim 1 wherein the element of the telecommunications network is an ENUM aggregator and the logical ingress trunk-group information and the gateway information are associated with an endpoint device of the telecommunications network in communication with the aggregator.

11. The method of claim 1 further comprising:
determining whether the ingress default trunk group is configured;
determining whether hop-by-hop routing is enabled; and
routing the call based on an original source of the ENUM request or an immediately preceding element of the telecommunications network.

12. The method of claim 1 further comprising routing the call through the packet-based network wherein an IP signaling profile is included in said logical ingress trunk group information and said IP signaling profile is used to control the media and signaling attributes in an ENUM response.

13. The method of claim 1 further comprising receiving data associated with a policy query based in part on the ingress gateway and the default ingress trunk group.

14. A telecommunications system comprising:
an interface in communication with a telecommunications network and a packet-based network for receiving data associated with an E.164 number mapping (ENUM) request from an element of the telecommunications network;
a processor module configured to:
(i) associate logical ingress trunk group information and gateway information with the ENUM request,
(ii) determine a network device to associate with a logical trunk and a gateway device by comparing the received data associated with an E.164 number mapping request with information associated with a set of ENUM clients stored in a database, and
(iii) upon the received data matching data associated with an ENUM client of the set of ENUM clients, define the ENUM client as an ingress gateway for the gateway information and an associated ingress default trunk group for the logical ingress trunk group information, and
(iv) manage a call through the packet-based network based at least in part on the logical ingress trunk group information and the gateway information; and
a policy server in communication with the processor module to provide a routing policy for routing the call through the packet-based network.

15. The system of claim 14 wherein the element of the telecommunications network is an aggregator of ENUM requests.

16. The system of claim 14 further comprising a forwarder of ENUM requests, wherein the element of the telecommunications network is an aggregator of ENUM requests or an endpoint device.

17. A computer program product, tangibly embodied in a non-transitory computer-readable storage medium, containing instructions operable to cause data processing apparatus to:
receive data associated with an E.164 number mapping (ENUM) request from an element of a telecommunications network, said data associated with the ENUM request including a domain name;
associate logical ingress trunk-group information and gateway information with the ENUM request;
determine a network device to associate with a logical trunk and a gateway device by comparing the received data with information associated with a set of ENUM clients stored in a database, and
upon the received data matching data associated with an ENUM client of the set of ENUM clients, define the ENUM client as an ingress gateway for the gateway information and an associated ingress default trunk group for the logical ingress trunk group information; and
manage a call through the packet-based network based at least in part on the ingress logical trunk group and the gateway information.

18. A telecommunications system comprising:
an interface in communication with a telecommunications network and a packet-based network for receiving an E.164 number mapping (ENUM) request and data associated with the E.164 number mapping (ENUM) request from an element of the telecommunications network, said element being a SIP, H.323 or Diameter endpoint and said ENUM request being based on the IP address of the element;
a special purpose processor configured to:
(i) associate logical ingress trunk group information and gateway information with the ENUM request,
(ii) determine a network device to associate with a logical trunk and a gateway device by comparing the received data associated with the E.164 number mapping (ENUM) request with information associated with a set of ENUM clients stored in a database, and
(iii) upon the received data matching data associated with an ENUM client of the set of ENUM clients, define the ENUM client as an ingress gateway for the gateway information and an associated ingress default trunk group for the logical ingress trunk group information, and (iv) manage a call through the packet-based network based at least in part on the logical ingress trunk group information and the gateway information.

19. The telecommunications system of claim 18 further comprising:
   a memory containing the database in which the set of ENUM clients is stored; and wherein
   said element of the telecommunications network is a Diameter endpoint;
   said special purpose processor is further configured to identify an ENUM client from said set of ENUM clients contained in said memory based on said IP address of the element; and
   said special purpose processor is further configured to associate logical ingress trunk group information and gateway information with ENUM requests based on a longest match algorithm for ENUM domains.

20. The method of claim 18 wherein said special purpose processor is further configured to route the call through the packet-based network wherein an IP signaling profile is included in said logical ingress trunk group information and said IP signaling profile is used to control the media and signaling attributes in an ENUM response.

* * * * *